United States Patent
Akami et al.

(10) Patent No.: US 6,400,901 B2
(45) Date of Patent: Jun. 4, 2002

(54) SHIELD DEVICE AND CAMERA

(75) Inventors: Noboru Akami, Chigasaki; Yuji Watanabe, Sagamihara; Akira Kayatama, Koganei, all of (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/769,250

(22) Filed: Jan. 26, 2001

(30) Foreign Application Priority Data

Jan. 26, 2000 (JP) ........................................ 2000-016684

(51) Int. Cl.7 ............................................... G03B 17/08

(52) U.S. Cl. ......................... 396/29; 396/349; 396/535

(58) Field of Search ............................ 396/349, 72, 29, 396/25, 76, 535, 6; 359/425, 830

(56) References Cited

U.S. PATENT DOCUMENTS 5,374,970 A  * 12/1994 Satoh et al. .................. 396/29
5,602,607 A  *  2/1997 Kato et al. .................. 396/349
5,652,922 A  *  7/1997 Kohno ......................... 397/72
6,038,087 A  *  5/2000 Suzuki et al ............... 359/819

FOREIGN PATENT DOCUMENTS

| JP | 8-146501 | 6/1996 |
| JP | 9-138334 | 5/1997 |
| JP | 10-031146 | 2/1998 |

* cited by examiner

Primary Examiner—David M. Gray (57) ABSTRACT

A shield device includes: a main body having an opening portion; a cylindrical member that is movable in a direction substantially perpendicular to the opening portion; and a shield member, an outer edge of which is engaged to an inner edge of the opening portion, and an inner edge of which is fitted upon an outer surface of the cylindrical member so as to be slidable thereon and so as to shield a gap between the main body and the cylindrical member. And the cylindrical member is movable through the opening portion in a direction of a central axis of the cylindrical member; at least a portion of an outer circumferential surface of the cylindrical member has a shape different from another portion thereof along the direction of the central axis; and the shield member contacts along the outer circumferential surface having the different shape, as the cylindrical member moves in the direction of the central axis.

20 Claims, 6 Drawing Sheets

SHIELD DEVICE AND CAMERA

INCORPORATION BY REFERENCE

The disclosure of the following priority application is herein incorporated by reference:

Japanese Patent Application No. 2000-16684 filed Jan. 26, 2000.

BACKGROUND OF THE INVENTION

1. Field of the Invention

The present invention relates to a shield device which shields a gap between two members which relatively move with respect to one another, and more particularly relates to a shield device which intercepts light rays and prevent them from getting into the interior of an optical apparatus through a gap between the main body of the optical apparatus and a lens barrel comprised in the optical apparatus, and also relates to a camera.

2. Description of the Related Art

In the prior art, as a shield device which shields the gap between two members which move relative to one another (for example a main body and a cylindrical member), for example in Japanese Laid-Open Patent Publication No. H10-31146, it has been disclosed to provide a protuberance upon the sliding surface of the shield member which slides against the outer circumferential surface portion of the moving cylindrical member, and to increase the contact force of the shield member against the outer circumferential surface portion of the cylindrical member by the presence of this protuberance, so as to intercept the light rays. Further, in Japanese Laid-Open Patent Publications No. H8-146501 and No. H9-138334, it is disclosed to obtain increased shielding effectiveness by providing a plurality of protuberances upon the shield member which fit against the outer circumferential surface portion of a lens barrel.

However, if the movable cylindrical member is manufactured from a plastic material, depending upon the circumstances of the mold shape, a step or burr due to a parting line may be formed upon its outer circumferential surface. Even though this parting line step or burr typically is minute, it is unavoidable for it to cause a minute gap to be formed in the surface contact between the cylindrical member and the shield member. Furthermore, alternatively, if a minute particle of foreign matter should get caught between the cylindrical member and the shield member, this can also cause a minute gap of the same type to open up between them.

If a prior art type shield device is utilized with the intention of intercepting light from getting through the gap between the main body of the camera and the lens barrel, there has been the problem that light rays may get into the body of the camera through this minute gap and may expose the film, which is most undesirable.

SUMMARY OF THE INVENTION

The object of the present invention is to propose a shield device and a camera which can reliably and effectively intercept light rays, even if a minute gap is present in the fitting of the shield member upon the cylindrical member.

In order to attain the above object, a shield device according to the present invention comprises: a main body having an opening portion; a cylindrical member that is movable in a direction substantially perpendicular to the opening portion; and a shield member, an outer edge of which is engaged to an inner edge of the opening portion, and an inner edge of which is fitted upon an outer surface of the cylindrical member so as to be slidable thereon and so as to shield a gap between the main body and the cylindrical member, and: the cylindrical member is movable through the opening portion in a direction of a central axis of the cylindrical member; at least a portion of an outer circumferential surface of the cylindrical member has a shape different from another portion thereof along the direction of the central axis; and the shield member contacts along the outer circumferential surface having the different shape, as the cylindrical member moves in the direction of the central axis.

In this shield device, it is preferred that a diameter of the at least a portion of the cylindrical member is different from a diameter of the another portion of the cylindrical member. In this case, it is preferred that the at least a portion of the cylindrical member is an end portion of the cylindrical member. Furthermore, it is preferred that when the cylindrical member is retracted within the main body, the shield member contacts along a shape of the end portion of the cylindrical member.

Also, it is preferred that the shield member is ring shaped, and its inner peripheral portion is an elastic member which can contact along the outer circumferential surface having the different shape.

Also, it is preferred that at least a portion of a surface of the shield member contacting along the at least a portion of the outer circumferential surface having the different shape is not parallel to the central axis.

Also, it is preferred that a surface of the shield member contacting along the at least a portion of the outer circumferential surface having the different shape is bent in the direction of the central axis.

Also, it is preferred that: the cylindrical member has a groove provided in the outer circumferential surface, extending in a circumferential direction, as the different shape; and the shield member is ring shaped and has a protuberance, which roughly agrees in shape with the groove, upon a surface of an inner peripheral portion thereof which slides against the outer circumferential surface of the cylindrical member.

A camera according to the present invention, comprises: a body cover having an opening; a lens barrel which is movable in a direction substantially perpendicular to the opening of the cover; and a shield member, an outer edge of which is engaged to an inner edge of the opening, and an inner edge of which is fitted upon an outer circumferential surface of the lens barrel so as to be slidable thereon and so as to shield a gap between the body cover and the lens barrel, and: the lens barrel is movable through the opening along a direction of the optical axis of the lens barrel; the outer circumferential portion of the lens barrel has a ring shaped portion which is discontinuous in the direction of the optical axis of the lens barrel, at least at one place; and when the lens barrel is shifted to a predetermined position in the direction of the optical axis, the inner edge of the shield member contacts along the ring shaped portion which is discontinuous.

DESCRIPTION OF THE PREFERRED EMBODIMENTS

Figure 1:
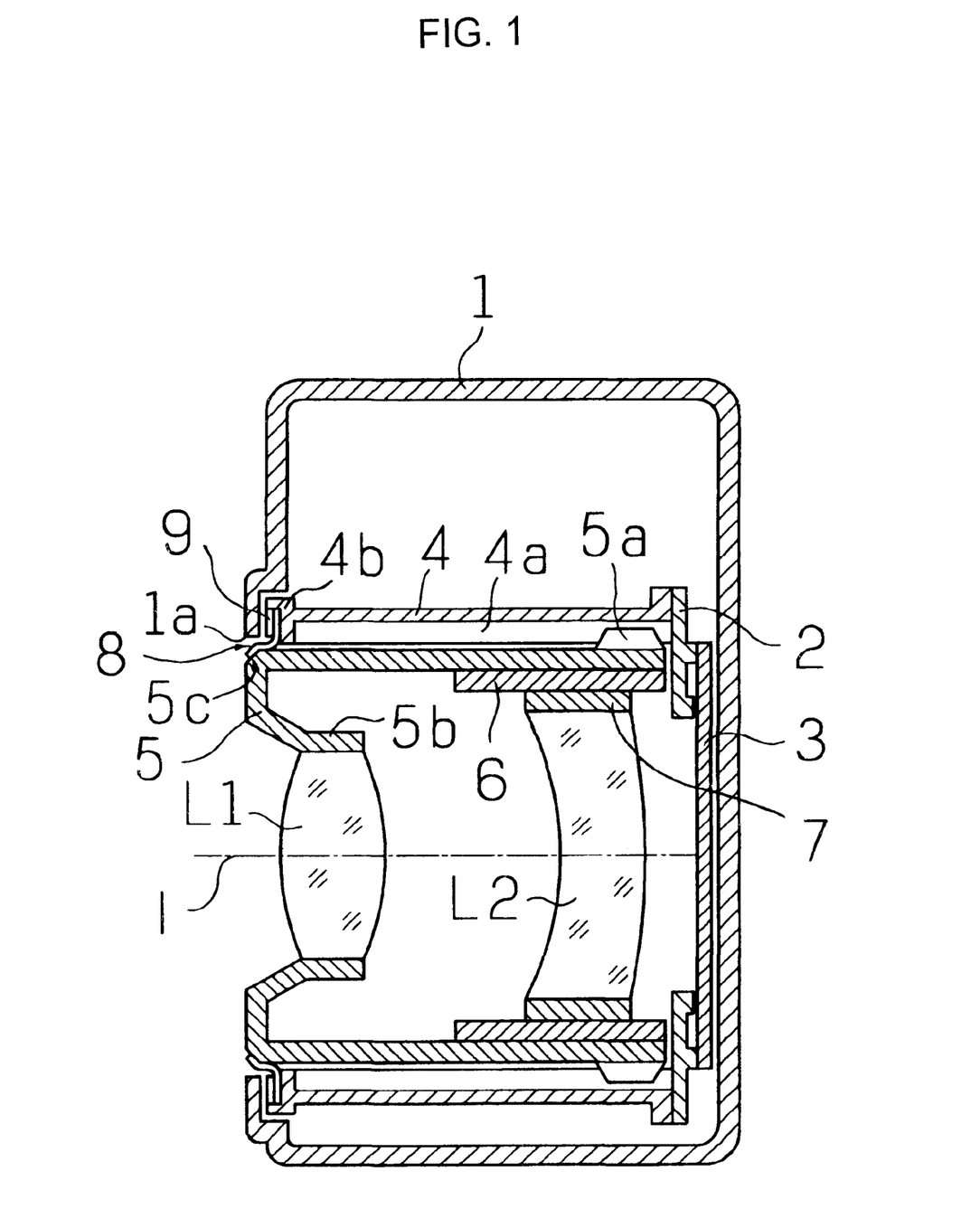
FIG. 1 is a sectional view showing a camera which is equipped with a shield device according to a first embodiment of the present invention.
Figure 2:
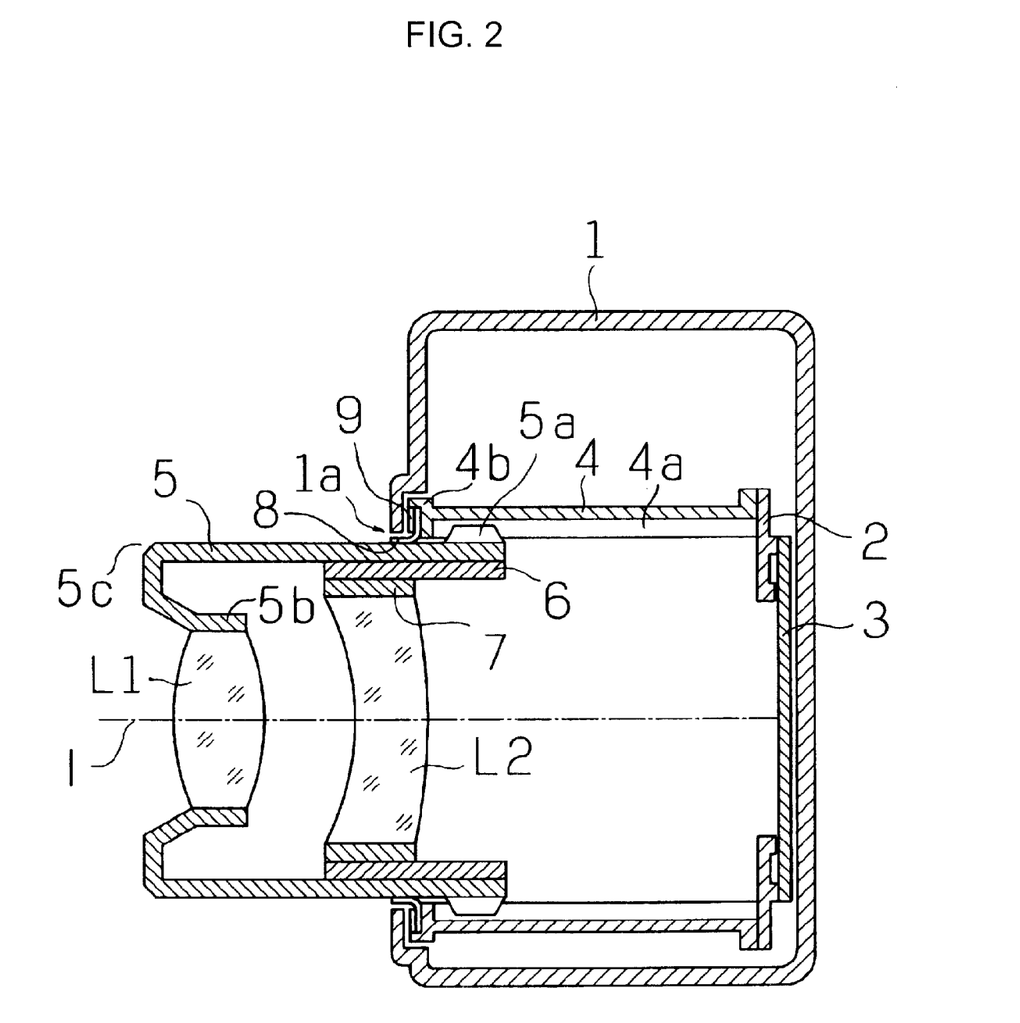
FIG. 2 is another sectional view showing this camera equipped with a shield device according to the first embodiment of the present invention.

A first embodiment of the present invention will be explained with reference to FIGS. 1 through 3B. FIGS. 1 and 2 are sectional views of a retractable (or collapsible) type zoom camera which is equipped with a shield device (or a light intercepting device) according to this embodiment. This camera comprises a lens barrel 5 which can move relative to the camera body, and FIG. 1 shows the state with the lens barrel in the retracted (or collapsed) state (or, while FIG. 2 shows the state with the lens barrel projected in the telephoto state. A cover 1 which provides the external appearance of the camera encases a main body 2 to which various mechanisms not shown in the figures are fixed. A pressure plate 3 defines, against the main body 2, a thin space through which passes a film not shown in the figures. A photographic optical system in the lens barrel is made up from a first lens group L1 and a second lens group L2, and the focal distance is varied by shifting this first lens group L1 and this second lens group L2 individually along the optical axis I.

The lens barrel comprises the movable cylinder 5, a cam cylinder 6, and a lens holder 7. A fixed cylinder 4 is fixed to the main body 2, and a female helicoid 4a is formed on the inner surface of this fixed cylinder 4. The movable cylinder 5 is screwingly engaged to the fixed cylinder 4 with a male helicoid 5a of the movable cylinder 5 and the female helicoid 4a of the fixed cylinder 4, and is extended and retracted along the direction of the optical axis I by being rotated. The first lens group L1 is mounted in an internal cylinder portion 5b of the movable cylinder 5, while the second lens group L2 is mounted within a lens holder 7. The cam cylinder 6 is fixed in the inner surface of the movable cylinder 5, and the second lens group L2 is moved by this cam cylinder 6 rotating as one together with the movable cylinder 5. These constructions for driving the movable cylinder 5 and the second lens group L2 are per se known, and accordingly detailed explanation thereof will herein be curtailed.

Next, the shield member will be explained. This shield member is made up from an elastic member 8, which can expand and contract and is made from a material which is endowed with elasticity such as silicon rubber or the like, and a ring shaped pad member 9 which is adhered to the elastic member 8 for ensuring the rigidity of the outer circumferential portion of this elastic member 8. The outer circumferential portion of this ring shaped shield member is disposed between an end portion 4b of the fixed cylinder 4 and the inner surface of an opening portion 1a of the cover 1, while, by taking advantage of the stretchability (elasticity) of the material of which this shield member is made, its inner circumferential portion is tightly but slidably engaged over the outer circumferential surface of the movable cylinder 5. In other words, since in its unstressed state the inner diameter of the elastic member 8 is somewhat smaller than the outer diameter of the movable cylinder 5, therefore when the elastic member 8 is fitted over the movable cylinder 5, the internal circumferential portion of the elastic member 8 is closely contacted against (or along) the outer circumferential surface of the movable cylinder 5 while the shape being altered. The shield member is held at the end portion 4b of the fixed cylinder 4 while being rotatable around the optical axis, so that as the movable cylinder 5 rotates around the optical axis the shield member rotates along with it. This is in order to reduce the drag when driving the movable cylinder 5. Due to this shield member (which may for example be blackened), light rays are intercepted and are prevented from getting into the inside of the camera through the gap between the opening portion 1a of the cover 1 and the outer circumferential surface of the movable cylinder 5. It should be noted that it goes without saying that, even if the shield member were fixed by being adhered to the end portion 4b of the fixed cylinder 4 or the like, light rays would still be intercepted and be prevented from getting into the inside of the camera.

Now, the state of the shield member when the lens barrel is in the retracted position will be explained in detail, using FIG. 3A which consists of a magnified portion of FIG. 1. A tapered portion 5c is formed upon the end portion of the movable cylinder 5 (the outer end portion of the movable cylinder). In the state in which the elastic member 8 is not fitted over the movable cylinder 5, it assumes the form shown by a two-dot chain line in the figure (and this undeformed state is shown in the same manner in FIGS. 4 through 7, to be described hereinafter); but, by fitting the movable cylinder 5 through the elastic member 8, its inner circumferential edge portion 8a is somewhat deformed and is tightly but slidably pressed against the outer circumferential portion of the movable cylinder 5. In the state in which the movable cylinder 5 is completely retracted, since the inner circumferential edge portion 8a is elastic, it deforms so as to lie against and to conform to the face of the tapered portion 5c, thus covering it. In this configuration, it is possible more efficiently to intercept light rays coming from the direction of the arrow A shown in FIG. 3A, roughly parallel to the optical axis I. In other words, when the movable cylinder 5 is in the retracted state, at least a portion of the elastic member 8 which is in contact with the surface of the movable cylinder 5 does not lie in parallel to the direction of the arrow A. Accordingly, even if a slight gap is opened up between the movable cylinder 5 and the elastic member 8 due to a particle of foreign matter or the like, light rays coming in the direction of the arrow A are reliably shielded or blocked. Further, even if light rays get through the gap at the edge portion of the elastic member 8, it is not possible for these light rays which have got in to proceed in straight lines, since they are diffracted by the surface where the elastic member 8 lies against the movable cylinder 5, and therefore they are reliably shielded (or blocked or intercepted).

Figure 3A:
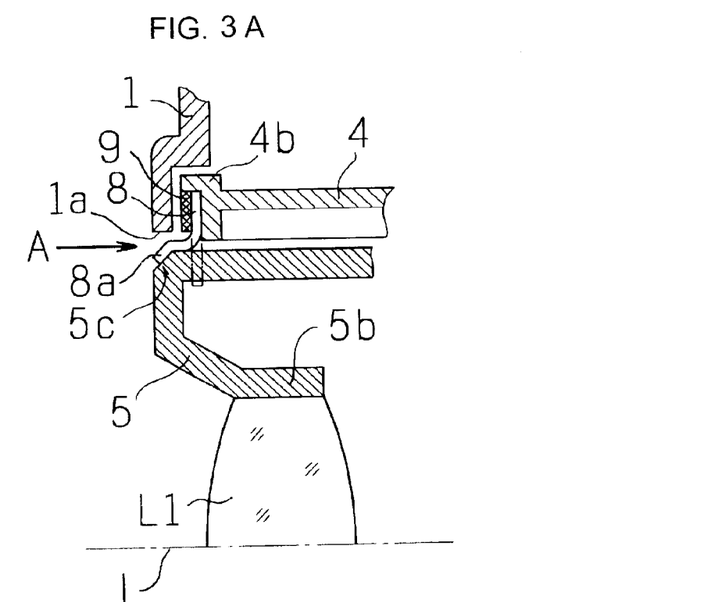
FIG. 3A is an enlarged sectional view showing a portion of this camera equipped with a shield device according to the first embodiment of the present invention.
Figure 3B:
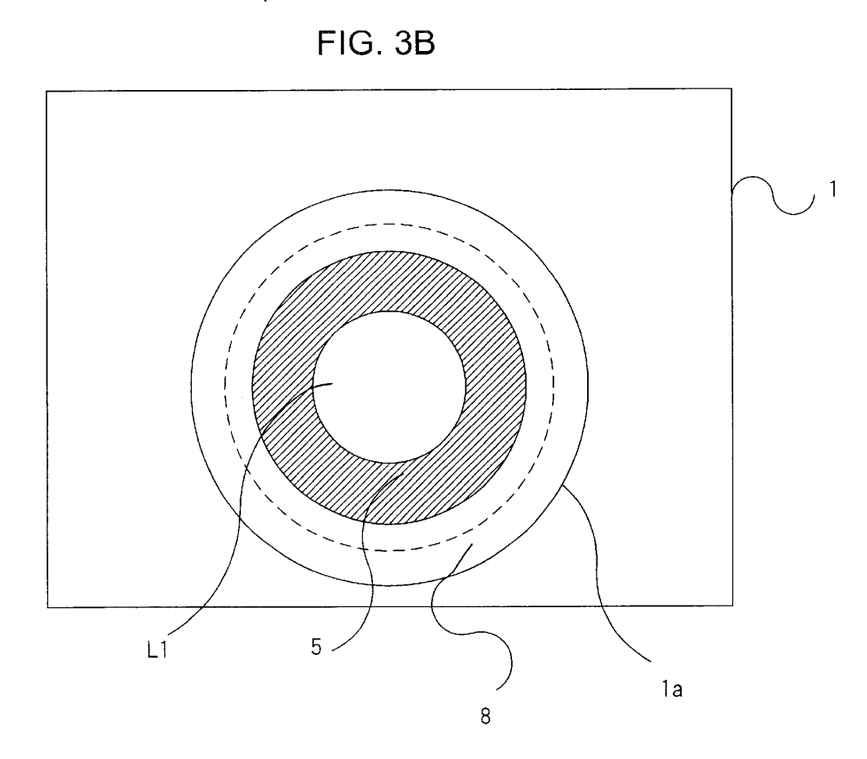
FIG. 3B is a view showing a front elevation of the camera in the FIG. 1 state.

FIG. 3B is a figure showing the camera in the FIG. 1 state as seen from the front. The opening portion 1a, the elastic member 8, the movable cylinder 5, and the first lens group L1 are visible.

Figure 4:
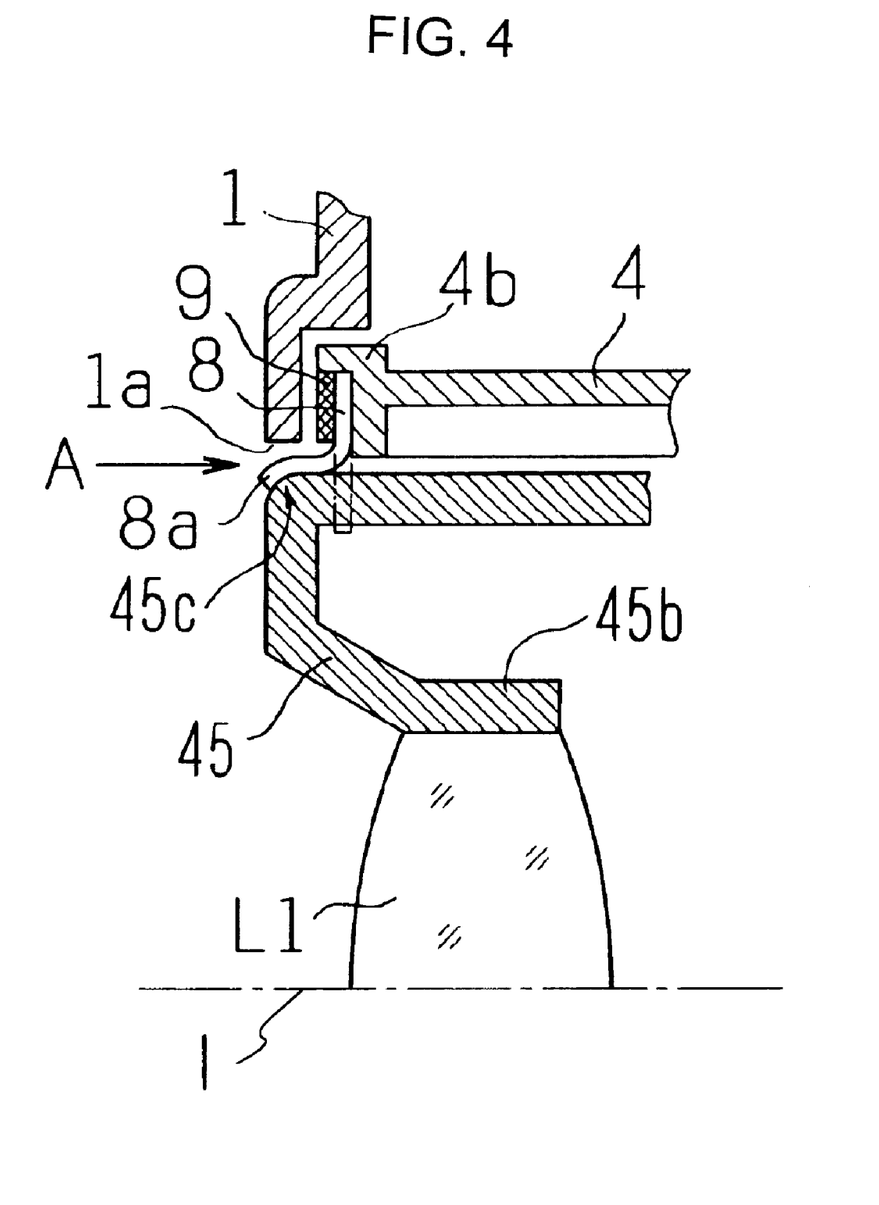
FIG. 4 is a sectional view showing a shield device according to a second embodiment of the present invention.

FIG. 4 is a sectional view showing a shield device according to a second embodiment of the present invention, with the same principal portions shown magnified as in FIG. 3A. Further, the basic construction of this shield device according to the second embodiment is the same as that of the first embodiment described above, and accordingly only the points of difference will be explained.

The end portion 45c of the movable cylinder 45 is formed as a smooth rounded chamfered edge. In the same manner as described above, with the movable cylinder 45 in the retracted state, the elastic member 8 is deformed so that its inner circumferential edge portion 8a wraps around this smooth rounded chamfered edge.

Figure 5:
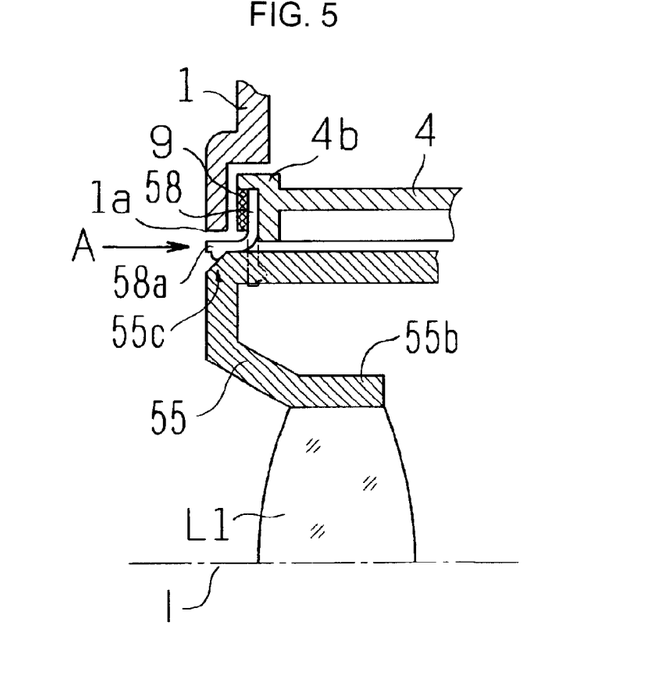
FIG. 5 is a sectional view showing a shield device according to a third embodiment of the present invention.

FIG. 5 is a sectional view showing a shield device according to a third embodiment of the present invention, with the same principal portions shown magnified as in FIG. 3A. Further, the basic construction of this third embodiment is the same as that of the shield device according to the first embodiment described above, and accordingly only the points of difference will be explained.

At the portion of the inner edge of the elastic member 58 which contacts against the outer peripheral surface of the movable cylinder 55, and particularly at its portion which covers over the tapered portion 55c of the movable cylinder 55, there is provided a ring shaped protuberance 58a. In the state in which the movable cylinder 55 is retracted, the protuberance 58a lies against and conforms to the face of the tapered portion 55c, and thus this inner circumferential portion 58a of the elastic member 58 is made so as to cover the tapered portion 55c.

Figure 6:
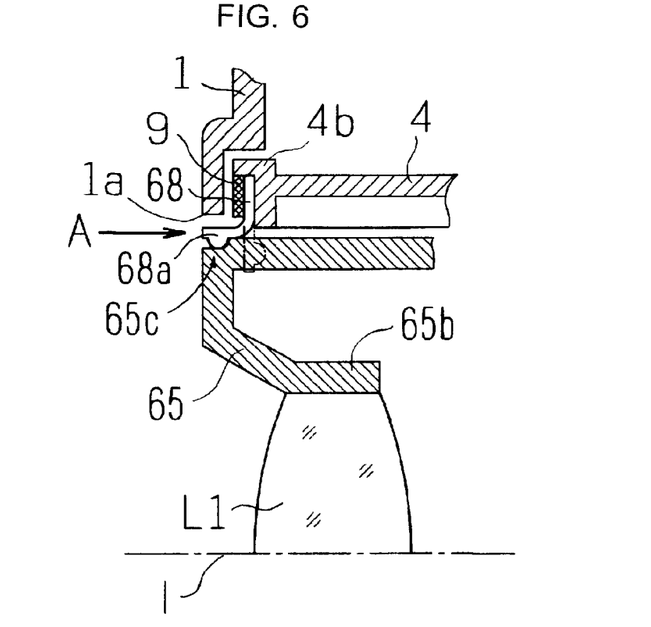
FIG. 6 is a sectional view showing a shield device according to a fourth embodiment of the present invention.

FIG. 6 is a sectional view showing a shield device according to a fourth embodiment of the present invention, with the same principal portions shown magnified as in FIG. 3A. Further, the basic construction of this fourth embodiment is the same as that of the shield device according to the first embodiment described above, and accordingly only the points of difference will be explained.

A step 65c is formed at the end portion of the movable cylinder 65, and a protuberance 68a is formed upon the elastic member 68 which roughly coincides with the step shape of this step portion 65c of the movable cylinder 65. In the state in which the movable cylinder 65 is retracted, the protuberance 68a is positioned over the step 65c, and the end portion of the elastic member 68 (the inner circumferential portion 68a) is deformed so as to cover over the step 65c.

It should be noted that, although with this fourth embodiment the protuberance 68a is formed upon the elastic member 68 and covers over the step 65c (contacts along the step 65c), the form of this protuberance 68a is not necessarily limited to the one shown in FIG. 6; for example, the same beneficial effect can also be obtained with the assembly of a movable cylinder 65 having a step 65c as shown in FIG. 6 and an elastic member 8 as shown in FIG. 3A.

Figure 7:
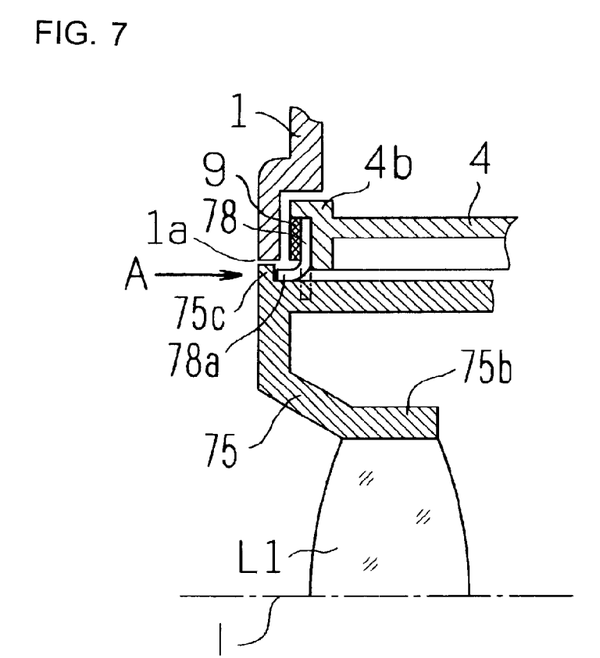
FIG. 7 is a sectional view showing a shield device according to a fifth embodiment of the present invention.

FIG. 7 is a sectional view showing a shield device according to a fifth embodiment of the present invention, with the same principal portions shown magnified as in FIG. 3A. Further, the basic construction of this fifth embodiment is the same as that of the shield device according to the first embodiment described above, and accordingly only the points of difference will be explained.

A flange 75c is formed upon the end portion of the movable cylinder 75. This flange 75c is made smaller, in the state in which the movable cylinder 75 is retracted, than the aperture in the cover 1, in other words than the opening portion 1a. And an elastic member 78 of the same form as the elastic member 8 of the first embodiment shown in FIG. 3A is fitted over the movable cylinder 75, and, in the state in which the movable cylinder 75 is retracted, its end portion 78a is positioned behind the flange 75c.

Now, normally, the time period over which the camera is exposed to light is overwhelmingly when the lens barrel is in the retracted state. As described above, if a minute gap is present in the engagement between the elastic member and the movable cylinder due to the influence of a step or burr shape of a parting line formed upon the outer circumferential surface when the movable cylinder is manufactured from plastic material, or if such a minute gap is present in the engagement of the elastic member and the movable cylinder due to a minute particle of foreign matter being caught between them, then light rays could pass through this minute gap and insinuate themselves into the interior of the camera, thus exposing the film, which is most undesirable. However, according to the embodiments described in FIGS. 3A through 7, light rays are effectively intercepted when the lens barrel is in the retracted state. When the lens barrel is not in the retracted state, in other words during the time period accompanying photography, there is no influence as compared to the time period in which the lens barrel is retracted, since this time period is by far the shorter, but in the retracted state which is the overwhelming time period over which the camera is exposed to light, the fact that it is possible for the light rays to be intercepted from getting into the interior of the camera is extremely effective.

Next, a shield device according to a sixth embodiment of the present invention will be explained with reference to FIG. 8.

The camera to which the shield device according to this embodiment is provided is equipped with with a photographic optical system of a so called step zoom type. In other words, the lens barrel can be controlled so as to vary the focal distance of the photographic optical system in six steps, and the construction is arranged so that the lens barrel stops in positions in which it is extended to each of these focal distances. The other features of the construction are the same as in the camera shown in FIG. 1, and accordingly the same reference symbols will be appended to them, and their description will be curtailed.

At the end portion of the movable cylinder 85 there is formed a step 85c of almost the same form as the step 65c shown in FIG. 6, and furthermore six of ring shaped circumferential grooves 85d are formed around the outer circumferential surface of the movable cylinder 85, spaced along the direction of the optical axis I. The number of these grooves 85d and their positions correspond to the number of zoom steps and their focal distances. Due to this, at each of the positions at which the lens barrel stops, the protruding portion 88a of the elastic member 88 engages into a corresponding one of the grooves 85d. Because of this construction, light rays are effectively intercepted from getting into the interior of the camera, not only when the lens barrel is in the retracted position, but also in the same manner when it is in any one of its projected positions.

Figure 8:
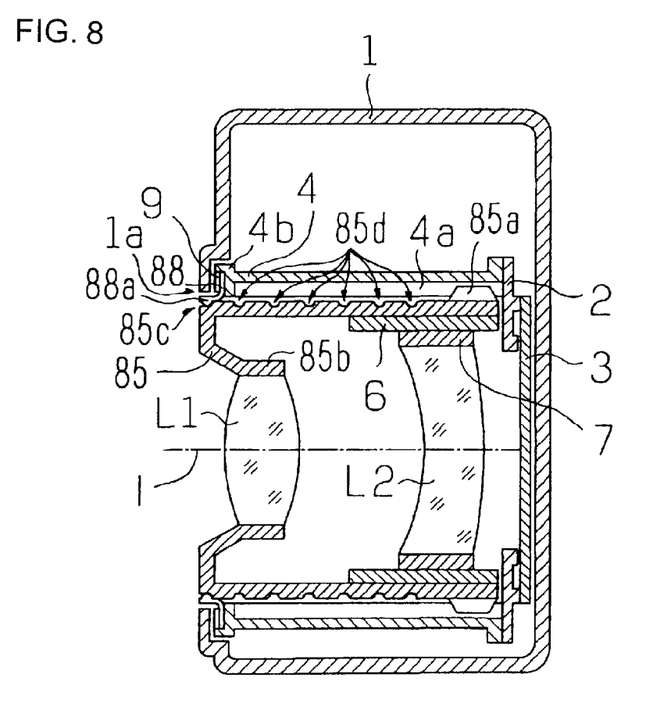
FIG. 8 is a sectional view showing a shield device according to a sixth embodiment of the present invention.

It should be noted that, although for the convenience of explanation in FIG. 8 the step 85c and the grooves 85d have been shown as enlarged, in practice it will be acceptable for them to be smaller, so as not to spoil the outward appearance of the camera, provided that they are of a size enough to be able to intercept light rays entering from the direction of the arrow A. Further, although in this sixth embodiment the protuberance 88a on the elastic member 88 was formed so as to contact against and cover over the step 85c and the grooves 85d, it should be understood that the shape of the protuberance 88a is not limited to the one shown in FIG. 8; any shape which is capable of intercepting light rays entering from the direction of the arrow A in the figure will be acceptable.

Although in the above described embodiments a single movable cylinder which moved relative to the body of the camera was provided, it is hardly necessary to say that, even in a more complicated optical system with a lens barrel which needs to comprise two or three movable cylinders, it is possible to intercept the light rays by providing the same type of construction to each of the movable cylinders and between the movable cylinders.

Although in the above described embodiments the description has been made, by way of example, in terms of a camera which uses film, the present invention is not to be considered as limited to this application. It could also be applied to an apparatus other than a camera. Further, it could also be applied to a digital camera which uses internally an imaging element such as a CCD or the like. Yet further, it could also be applied to a video camera. In other words, the present invention can be applied to any apparatus which incorporates and employs a light sensitive element such as a film or a CCD or the like.

What is claimed is:

1. A shield device comprising:

a main body having an opening portion;

a cylindrical member movable through said opening portion in a direction of a central axis of said cylindrical member, said cylindrical member having an end portion with a chamfered shape; and a shield member, an outer edge of which is engaged to an inner edge of said opening portion, and an inner edge of which is fitted upon an outer surface of said cylindrical member so as to be slidable thereon and so as to shield a gap between said main body and said cylindrical member, wherein when said cylindrical member is retracted within said main body, said shield member contacts along said chamfered shape and is bent in the direction of the central axis.

2. A shield device according to claim 1, wherein said chamfered shape is a tapered shape.

3. A shield device according to claim 1, said chamfered shape is a rounded shape.

4. A shield device according to claim 1, wherein said shield member is ring shaped, and its inner peripheral portion is an elastic member which can contact along said chamfered shape of said end portion.

5. A shield device comprising:

main body having an opening portion:

a cylindrical member movable through said opening portion in a direction of a central axis of said cylindrical member, said cylindrical member having a groove provided in said outer circumferential surface, extending in a circumferential direction; and a shield member having an outer edge engaged to an inner edge of said opening portion and an inner edge of which is fitted upon an outer surface of said cylindrical member so as to be slidable thereon and so as to shield a gap between said main body and said cylindrical member, wherein said shield member contacts along said outer circumferential surface, as said cylindrical member moves in the direction of the central axis and said shield member is ring shaped and has a protuberance, which roughly agrees in shape with said groove, upon a surface of an inner peripheral portion thereof which slides against said outer circumferential surface of said cylindrical member.

6. A shield device according to claim 5, wherein said chamfered shape is a tapered shape.

7. A shield device according to claim 5, said chamfered shape is a rounded shape.

8. A shield device according to claim 5, wherein said shield member is ring shaped, and its inner peripheral portion is an elastic member which can contact along said chamfered shape of said end portion.

9. A camera, comprising:

a body cover having an opening;

a lens barrel movable through said opening along a direction of an optical axis of said lens barrel, said lens barrel having an end portion with a chamfered shape; and a shield member, an outer edge of which is engaged to an inner edge of said opening, and an inner edge of which is fitted upon an outer circumferential surface of said lens barrel so as to be slidable thereon and so as to shield a gap between said body cover and said lens barrel, wherein when said lens barrel is shifted to a predetermined position, said shield member contacts along said chamfered shape and a surface of said shield member is bent in the direction of the optical axis.

10. A camera according to claim 9, wherein said chamfered shape is a tapered shape.

11. A camera according to claim 9, said chamfered shape is a rounded shape.

12. A camera according to claim 9, wherein said shield member is ring shaped, and its inner peripheral portion is an elastic member which can contact along said chamfered shape of said end portion.

13. A camera, comprising:

a body cover having an opening;

a lens barrel, movable through the opening along a direction at an optical axis of lens barrel, having a groove provided in an outer circumferential surface, extending in a circumferential direction; and a shield member, an outer edge of which is engaged to an inner edge of the opening, and an inner edge of which is fitted upon the outer circumferential surface of the lens barrel so as to be slidable thereon and so as to shield a gap between the body cover and the lens barrel, wherein the shield member contacts the outer circumferential surface, as the lens barrel moves in the direction of the optical axis of the lens barrel; and the shield member is ring shaped and has a protuberance, which roughly agrees in shape with the groove, upon a surface of an inner peripheral portion thereof which slides against the outer circumferential surface of the lens barrel.

14. A camera according to claim 13, wherein the protuberance has a triangular shape.

15. A camera according to claim 13, wherein the protuberance has a rounded shape.

16. A camera according to claim 13, wherein the shield member inner edge is an elastic member.

17. A camera, comprising:

a body with an opening;

a lens barrel movable through said opening in a direction of a central axis of said lens barrel, said lens barrel having at least one groove provided in an outer circumferential surface; and a shield member, an outer edge of which is engaged to an inner edge of the opening, and an inner edge of which is fitted upon the outer circumferential surface of the lens barrel so as to be slidable thereon and so as to shield a gap between the body and the lens barrel, wherein the shield member has a protuberance, which roughly agrees in shape with the at least one groove.

18. A camera according to claim 17, wherein the protuberance has a triangular shape.

19. A camera according to claim 17, wherein the protuberance has a rounded shape.

20. A camera according to claim 17, wherein the shield member inner edge is an elastic member.

* * * * *

UNITED STATES PATENT AND TRADEMARK OFFICE
CERTIFICATE OF CORRECTION

PATENT NO. : 6,400,901 B2
DATED : June 4, 2002
INVENTOR(S) : Noboru Akami et al.

It is certified that error appears in the above-identified patent and that said Letters Patent is hereby corrected as shown below:

<u>Column 8,</u>
Line 36, after "of" insert -- the --.
Line 46, delete ";".

Signed and Sealed this

Nineteenth Day of November, 2002

Attest:

Attesting Officer

JAMES E. ROGAN
Director of the United States Patent and Trademark Office